US012651517B2

(12) United States Patent
Wolf et al.

(10) Patent No.: US 12,651,517 B2
(45) Date of Patent: Jun. 9, 2026

(54) EVENT NOTIFICATION DEVICE

(71) Applicant: Honeywell International Inc., Charlotte, NC (US)

(72) Inventors: Benjamin H. Wolf, Leicester (GB); Michael Barson, Nuneaton (GB); Christopher Dearden, Melton Mowbray (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/795,563

(22) Filed: Aug. 6, 2024

(65) Prior Publication Data

US 2026/0045153 A1 Feb. 12, 2026

(51) Int. Cl.
*G08B 7/06* (2006.01)

(52) U.S. Cl.
CPC .................................... *G08B 7/066* (2013.01)

(58) Field of Classification Search
CPC ........ G08B 7/066; G08B 7/062; G08B 21/02; H04W 4/90
See application file for complete search history.

(56) References Cited

U.S. PATENT DOCUMENTS 4,074,225 A * 2/1978 Vandeweghe ............ A62B 3/00 340/584
6,150,943 A * 11/2000 Lehman ................. G08B 7/062 340/332
6,313,549 B1 * 11/2001 Moisan .................. G08B 7/066 307/66
10,991,216 B1 4/2021 Alali et al.
11,188,993 B2 11/2021 Sharma et al.
(Continued)

FOREIGN PATENT DOCUMENTS

CN 104994450 A 10/2015
EP 4246479 A1 9/2023
GB 2225661 A 6/1990

OTHER PUBLICATIONS

Kuo, et al. Using Smartphones for Indoor Fire Evacuation, webpage, https://www.ncbi.nlm.nih.gov/pmc/articles/PMC9141885/, accessed Feb. 5, 2024, 8 pages.

*Primary Examiner* — Curtis J King
(74) *Attorney, Agent, or Firm* — Brooks, Cameron & Huebsch, PLLC

(57) ABSTRACT

Devices, methods, and systems for an event notification device are described herein. A first event notification device can include a first speaker and a first controller configured to receive a first command to broadcast an audio message indicating a direction of evacuation in response to the first event notification device being the first event notification device along an evacuation route and broadcast the audio message sequenced with a number of event notification devices to indicate the direction of evacuation in response to receiving the first command. The number of event notification devices can each comprise a speaker and a controller configured to receive a second command to broadcast the audio message indicating the direction of evacuation and broadcast the audio message sequenced with the number of event notification devices to indicate the direction of evacuation via the speaker in response to receiving the second command.

20 Claims, 10 Drawing Sheets

(56) References Cited

U.S. PATENT DOCUMENTS

| | | | | |
|---|---|---|---|---|
| 11,615,685 | B2 * | 3/2023 | Ryder | G08B 17/12 340/577 |
| 11,620,884 | B2 * | 4/2023 | Derickson | G08B 7/066 340/691.6 |
| 11,626,002 | B2 * | 4/2023 | Donegan | G08B 29/188 340/540 |
| 2004/0201470 | A1 * | 10/2004 | Reed | G08B 7/062 340/506 |
| 2005/0212677 | A1 * | 9/2005 | Byrne | G08B 25/12 340/574 |
| 2007/0194922 | A1 * | 8/2007 | Nathan | A62B 99/00 340/8.1 |
| 2008/0204267 | A1 * | 8/2008 | Luterotti | G08B 7/066 340/815.4 |
| 2008/0258924 | A1 * | 10/2008 | Moss | G08B 17/10 340/584 |
| 2011/0163869 | A1 | 7/2011 | Sundholm | |
| 2013/0147604 | A1 * | 6/2013 | Jones, Jr. | G08B 25/08 340/6.1 |
| 2015/0170503 | A1 * | 6/2015 | Wedig | G08B 7/066 340/691.5 |
| 2018/0188034 | A1 | 7/2018 | Duan | |
| 2019/0114891 | A1 * | 4/2019 | Eck | G08B 17/10 |
| 2019/0371137 | A1 * | 12/2019 | Fortin | G08B 7/066 |
| 2023/0129804 | A1 * | 4/2023 | Piccolo, III | H04R 27/00 340/287 |
| 2023/0145066 | A1 * | 5/2023 | Jeong | G01C 21/3697 705/324 |
| 2023/0177937 | A1 * | 6/2023 | Derickson | G06Q 50/265 340/577 |
| 2023/0260379 | A1 * | 8/2023 | Zaikonnikov | H04R 27/00 340/384.72 |
| 2024/0087431 | A1 * | 3/2024 | Luu | G08B 3/1008 |
| 2024/0395128 | A1 * | 11/2024 | Singh Thakur | G01C 21/20 |

* cited by examiner

EVENT NOTIFICATION DEVICE

TECHNICAL FIELD

The present disclosure relates generally to devices, methods, and systems for an event notification device.

BACKGROUND

Large facilities (e.g., buildings), such as commercial facilities, office buildings, hospitals, and the like, may have an event notification system (e.g., fire alarm system) that can be triggered during an emergency situation (e.g., a fire) to warn occupants to evacuate. For example, an event notification system may include a control panel (e.g., fire control panel) and a plurality of event notification devices (e.g., smoke detectors), located throughout the facility (e.g., on different floors and/or in different rooms of the facility) that can sense an event (e.g., fire) occurring in the facility and provide a notification of the event to the occupants of the facility via alarms. The alarms can be broadcast by event notification devices including audio and/or visual alarms, for example.

Often casualties and fatalities occur due to occupants taking an unsafe route to evacuate in response to the audio and/or visual alarms. For example, when people enter an unfamiliar building, and a fire or other emergency situation subsequently arises, commonly they will attempt to leave the building via the same exit by which they entered. This behavior could lead them directly into danger.

DETAILED DESCRIPTION

Figure 1:
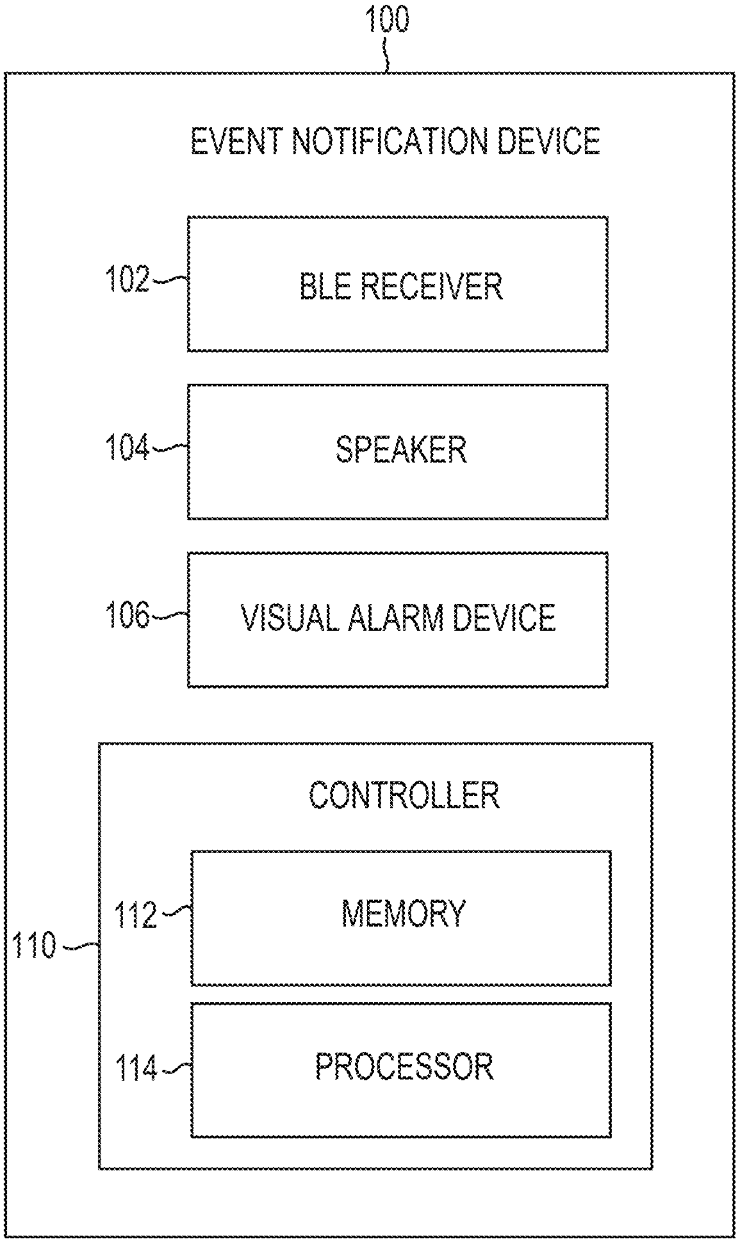
FIG. 1 illustrates a block diagram of an event notification device in accordance with an embodiment of the present disclosure.

Devices, methods, and systems for an event notification device are described herein. An event notification system can include a first event notification device of a number of event notification devices comprising a first speaker and a first controller configured to receive a first command to broadcast an audio message indicating a direction of evacuation in response to the first event notification device being the first event notification device along an evacuation route and broadcast the audio message sequenced with the number of event notification devices to indicate the direction of evacuation via the first speaker in response to receiving the first command. The number of event notification devices can each comprise a speaker and a controller. Each controller of the number of event notification devices can be configured to receive a second command to broadcast the audio message indicating the direction of evacuation and broadcast the audio message sequenced with the number of event notification devices to indicate the direction of evacuation via each speaker of the number of event notification devices in response to receiving the second command after the first speaker broadcasts the audio message.

In contrast to previous event notification devices in which an alarm, such as, a tone or a beep are broadcast or light is emitted, event notification devices in accordance with the present disclosure can indicate a direction of evacuation. The event notification device can broadcast an audio message indicating the direction of evacuation or emit a light indicating the direction of evacuation, for example. Occupants of the building can follow the audio message and/or light to safely evacuate the building. Accordingly, event notification devices in accordance with the present disclosure may prevent occupants from going towards the event (e.g., fire), which could lead to bodily injury or death.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 220 may reference element "20" in FIG. 2, and a similar element may be referenced as 420 in FIG. 4.

As used herein, "a", "an", or "a number of" something can refer to one or more such things, while "a plurality of" something can refer to more than one such things. For example, "a number of event notification devices" can refer to one or more event notification devices, while "a plurality of event notification devices" can refer to more than one event notification device.

FIG. 1 illustrates a block diagram of an event notification device 100 in accordance with an embodiment of the present disclosure. The event notification device 100 can include a BLE receiver 102, a speaker 104, a visual alarm device 106, and a controller (e.g., microcontroller) 110. The controller 110 can include a memory 112 and a processor 114. Memory 112 can be any type of storage medium that can be accessed by processor 114 to perform various examples of the present disclosure. For example, memory 112 can be a non-transitory computer readable medium having computer readable instructions (e.g., computer program instructions) stored thereon that are executable by processor 114 to cause the controller 110 to indicate a direction of evacuation in accordance with the present disclosure. For instance, processor 114 can execute the executable instructions stored in memory 112 to receive a command to broadcast an audio message indicating a direction of evacuation in response to the event notification device 100 being the first event notification device along an evacuation route and broadcast the audio message sequenced with the number of event notification devices to indicate the direction of evacuation via the speaker 104 in response to receiving the command. The evacuation route can lead to an exit, away from danger, or a less populated area.

The audio message can include instructions to follow this route and/or an audio command. In a number of embodiments, the audio message can be within one or more frequency bands and/or in a particular pitch.

The controller 110 can be configured to repeat the broadcast after a last event notification device of a number of event notification devices along the evacuation route has broadcast the audio message. In some examples a tone sequenced with the number of event notification devices to indicate the direction of evacuation can be broadcast prior to broadcasting the audio message. The tone can be a directional sound source with frequencies localized by a human ear.

In a number of embodiments, each of the number of event notification devices can comprise a speaker and a controller. Each controller of the number of event notification devices can receive a different command to broadcast the audio message indicating the direction of evacuation. Each controller of the number of event notification devices can broadcast the audio message sequenced with the number of event notification devices to indicate the direction of evacuation via each speaker in response to receiving the command after the speaker 104 of the event notification device 100 broadcasts the audio message.

The visual alarm device 106 can include a light emitting-diode (LED) and/or a strobe light. The controller 110 can be configured to receive a command to emit a light indicating a direction of evacuation in response to the event notification device 100 being the first event notification device along an evacuation route. The controller 110 can emit the light sequenced with the number of event notification devices to indicate the direction of evacuation via the visual alarm device 106 in response to receiving the command. The controller 110 can repeat the emission of the light after a last event notification device along the evacuation route has emitted a last light.

Brightness level can be used instead of or in conjunction with movement or intermittence of the light of the event notification device 100. The event notification device 100 can emit the light at a particular brightness level. In some examples, the brightness level can be based on a location of the event notification device 100 along the evacuation route. For instance, the brightness level if the event notification device 100 is further along the evacuation route can be brighter than if the event notification device 100 was less far along the evacuation route. The evacuation route can brighten as a person moves along the evacuation route. The visual alarm device 106 of the event notification device 100 could also use color instead of brightness to indicate the direction of evacuation.

In some examples, a different event notification device of the number of event notification devices can include a visual alarm device and a controller. The controller of the different event notification device can receive a command to emit a light indicating the direction of evacuation in response to the different event notification device being the second or the next event notification device along the evacuation route. The controller of the different event notification device can emit the light sequenced with the number of event notification devices to indicate the direction of evacuation via the visual alarm device of the different event notification device in response to receiving the command after the visual alarm device 106 emits the light. The different event notification device can emit the light after the visual alarm device 106 emits the light if the different event notification device is closer to the exit than event notification device 100.

The controller 110 can further broadcast a tone sequenced with the number of event notification devices to indicate a direction of evacuation via the speaker 104. Then the controller 110 can trigger the visual alarm device 106 sequenced with the number of event notification devices to indicate the direction of evacuation via the visual alarm device 106 in response to broadcasting the tone followed by broadcasting the audio message sequenced with the number of event notification devices to indicate the direction of evacuation via the speaker 104 in response to triggering the visual alarm device 106. Triggering the visual alarm device 106 can include emitting light.

In a number of embodiments, processor 114 can execute the executable instructions stored in memory 112 to receive a BLE signal via the BLE receiver 102, transmit a notification of the BLE signal responsive to receiving the BLE signal, receive a command to broadcast an audio message indicating a direction of evacuation after transmitting the notification of the BLE signal, and broadcast the audio message indicating the direction of evacuation via the speaker 104 responsive to receiving the command.

An event notification device 100 can receive a BLE signal via the BLE receiver 102. The BLE signal can be transmitted from a computing device, for example, a wearable device, a smartphone, a tablet, a laptop, or a desktop to the BLE receiver 102 of the event notification device 100. The BLE signal can be transmitted continuously, periodically, or responsive to a command.

The event notification device 100 can transmit a notification of the BLE signal responsive to receiving the BLE signal. In some examples, the notification of the BLE signal can be transmitted to a fire control panel.

A command to broadcast an audio message and/or emit a light indicating a direction of evacuation can be received by the event notification device 100 after transmitting the notification of the BLE signal. The command to broadcast the audio message and/or emit the light indicating the direction of evacuation can be received from the fire control panel, for example.

Figure 2:
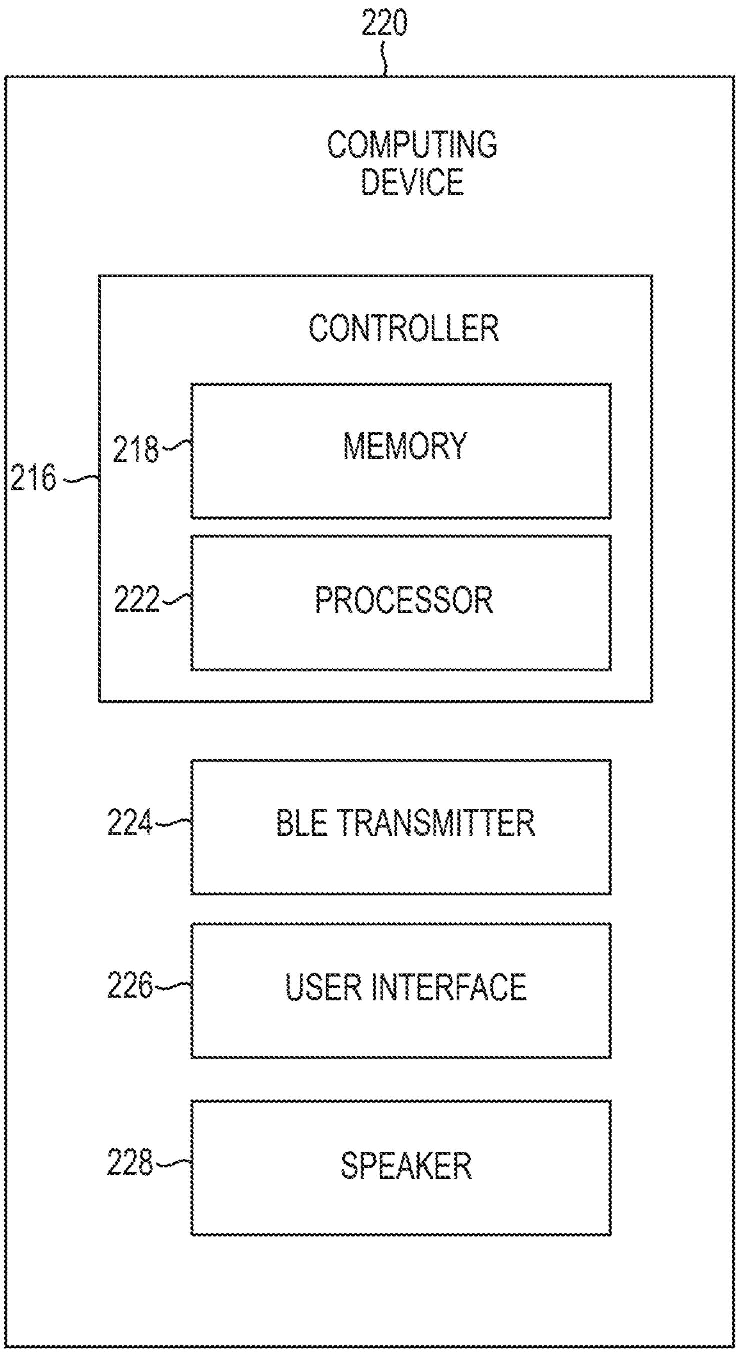
FIG. 2 illustrates a block diagram of a computing device in accordance with an embodiment of the present disclosure.

FIG. 2 illustrates a block diagram of a computing device 220 in accordance with an embodiment of the present disclosure. The computing device 220 includes a controller (e.g., microcontroller) 216, a BLE transmitter 224, a user interface 226, and a speaker 228. The computing device 220 can be a wearable device, a smartphone, a tablet, or a laptop, for example.

The controller 216 can include a memory 218 and a processor 222. Memory 218 can be any type of storage medium that can be accessed by processor 222 to perform various examples of the present disclosure. For example, memory 218 can be a non-transitory computer readable medium having computer readable instructions (e.g., computer program instructions) stored thereon that are executable by processor 222 to indicate a direction of evacuation in accordance with the present disclosure. For instance, processor 222 can execute the executable instructions stored in memory 218 to transmit a BLE signal via the BLE transmitter 224 and receive a command to display an evacuation route on the user interface 226 or broadcast an audio message from the speaker 228 after transmitting the BLE signal.

The computing device 220 can transmit a BLE signal. The BLE signal can be transmitted continuously, periodically, or responsive to a command. In some examples, the BLE signal can be received by a number of event notification devices (e.g., event notification device 100 in FIG. 1).

The number of event notification devices can transmit a notification of the BLE signal responsive to receiving the BLE signal. In some examples, the notification of the BLE signal can be transmitted to a fire control panel.

A command to display an evacuation route on the user interface 226 or broadcast an audio message from the speaker 228 can be received at the computing device 220 after transmitting the BLE signal. The command to display the evacuation route on the user interface 226 or broadcast the audio message from the speaker 228 can be received from the fire control panel and/or an event notification device, for example.

Figure 3:
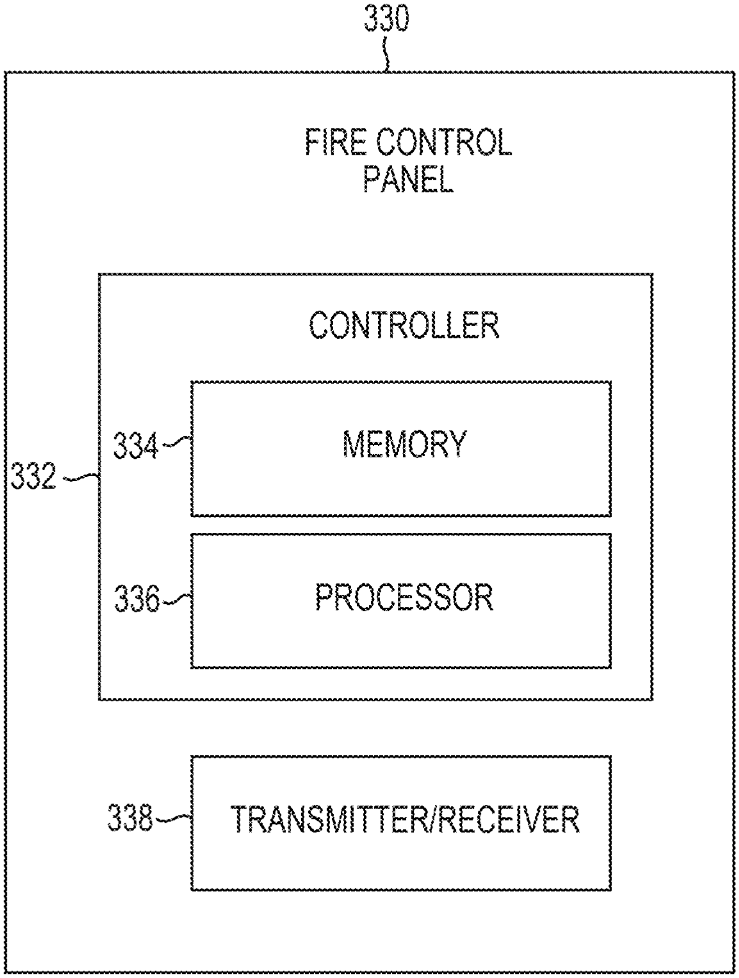
FIG. 3 illustrates a block diagram of a fire control panel in accordance with an embodiment of the present disclosure.

FIG. 3 illustrates a block diagram of a fire control panel 330 in accordance with an embodiment of the present disclosure. The fire control panel 330 can be a monitoring device, a fire detection control system, and/or a cloud computing device. The fire control panel 330 can be configured to send commands to and/or receive notifications from event notification devices (e.g., event notification device 100 in FIG. 1) and/or computing devices (e.g., computing device 220 in FIG. 2) via a wired or wireless network. The fire control panel 330 includes a controller (e.g., microcontroller) 332 and a transmitter/receiver 338.

The controller 332 can include a memory 334 and a processor 336. Memory 334 can be any type of storage medium that can be accessed by processor 336 to perform various examples of the present disclosure. For example, memory 334 can be a non-transitory computer readable medium having computer readable instructions (e.g., computer program instructions) stored thereon that are executable by processor 336 to provide a command to an event notification device and/or a computing device to indicate a direction of evacuation in accordance with the present disclosure. For instance, processor 336 can execute the executable instructions stored in memory 334 to identify a number of event notification devices along an evacuation route, sequence the number of event notification devices along the evacuation route in order of the direction of evacuation, and/or transmit a command to each of the number of event notification devices along the evacuation route in the sequence. In some examples, the controller 332 can transmit a command to an event notification device first in response to the event notification device being the first event notification device along the evacuation route and/or transmit a command to an event notification device last in response to the event notification device being the last event notification device along the evacuation route.

In some examples, processor 336 can execute the executable instructions stored in memory 334 to receive a notification of a BLE signal from an event notification device, determine a location of a person based on the event notification device from which the notification of the BLE signal was received, receive a notification of a fire from a different event notification device, determine a location of the fire based on the different event notification device from which the notification of the fire was received, and determine an evacuation route for the person based on the location of the person and the location of the fire.

In a number of embodiments, the fire control panel 330 can identify a number of event notification devices along the evacuation route. In some examples, this includes the event notification device from which the BLE signal was received. A command can be transmitted to each of the number of event notification devices along the evacuation route from the fire control panel 330. In some examples, the number of event notification devices along the evacuation route can broadcast an audio message at different times and/or initiate an emission of light at different times responsive to receiving the command.

The event notification device from which the BLE signal was received can be the first of the number of event notification devices to broadcast an audio message or emit light responsive to receiving the command. A neighboring event notification device of the number of event notification devices that is closest to the event notification device from which the BLE signal was received can be a second of the number of event notification devices to broadcast the audio message or emit light responsive to receiving the command.

Figure 4:
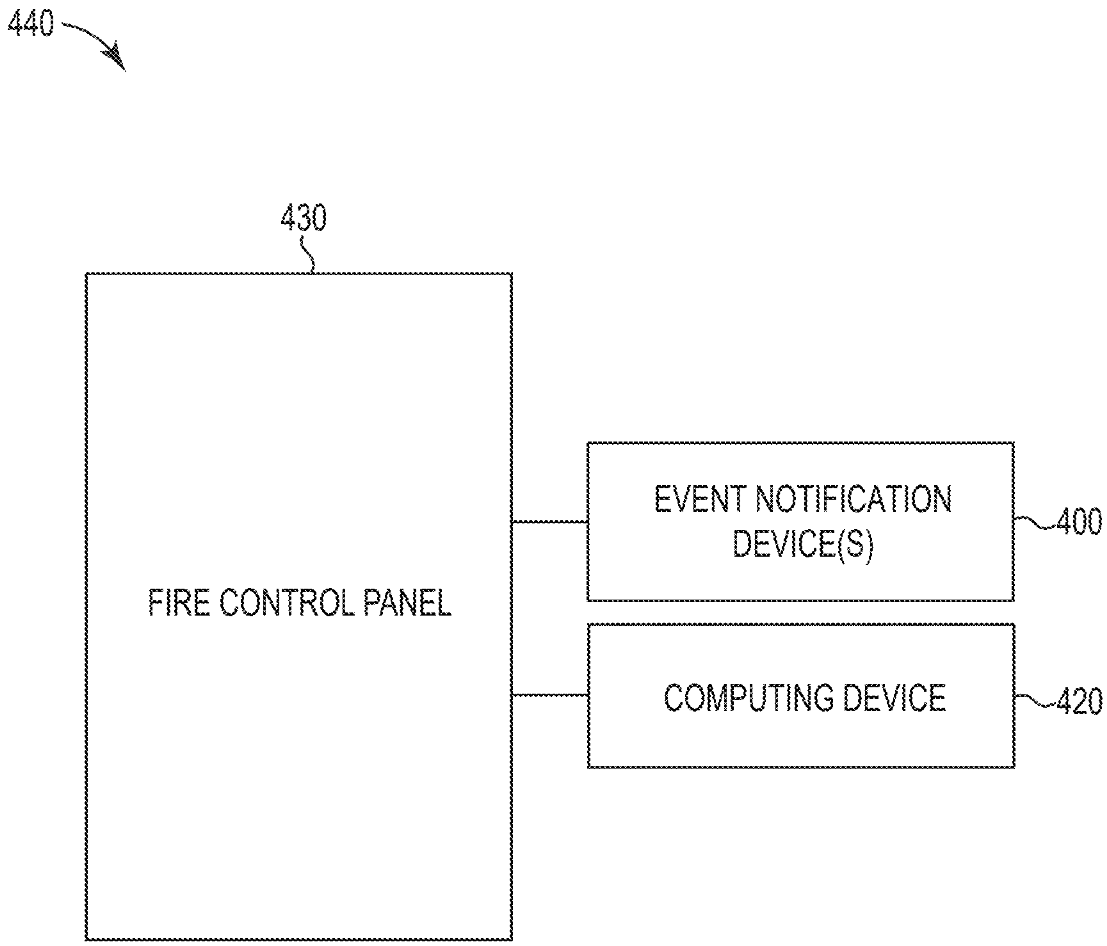
FIG. 4 illustrates a block diagram of an event notification system in accordance with an embodiment of the present disclosure.

FIG. 4 illustrates a block diagram of an event notification system 440 in accordance with an embodiment of the present disclosure. The event notification system 440 can be a two-wire addressable fire system and can include a fire control panel 430, a number of event notification devices 400, and/or a computing device 420. The fire control panel 430 can correspond to fire control panel 330 described in connection with FIG. 3, the number of event notification devices 400 can correspond to event notification device 100 described in connection with FIG. 1, and the computing device 420 can correspond to computing device 220 described in connection with FIG. 2.

The fire control panel 430 can be configured to send commands to and/or receive notifications from the number of event notification devices 400 and/or computing device 420 via a wired or wireless network. The networks described herein can be a network relationship through which the fire control panel 430, the number of event notification devices 400, and/or computing device 420 can communicate with each other. Examples of such a network relationship can include a distributed computing environment (e.g., a cloud computing environment), a wide area network (WAN) such as the Internet, a local area network (LAN), a personal area network (PAN) including Bluetooth low energy (BLE), a campus area network (CAN), or metropolitan area network (MAN), among other types of network relationships. For instance, the network can include a number of servers that receive information from and transmit information to the fire control panel 430, event notification device 400, and/or computing device 420 via a wired or wireless network.

As used herein, a "network" can provide a communication system that directly or indirectly links two or more computers and/or peripheral devices and allows, for example, a fire control panel 430 to access data and/or resources on the number of event notification devices 400 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

Figure 5:
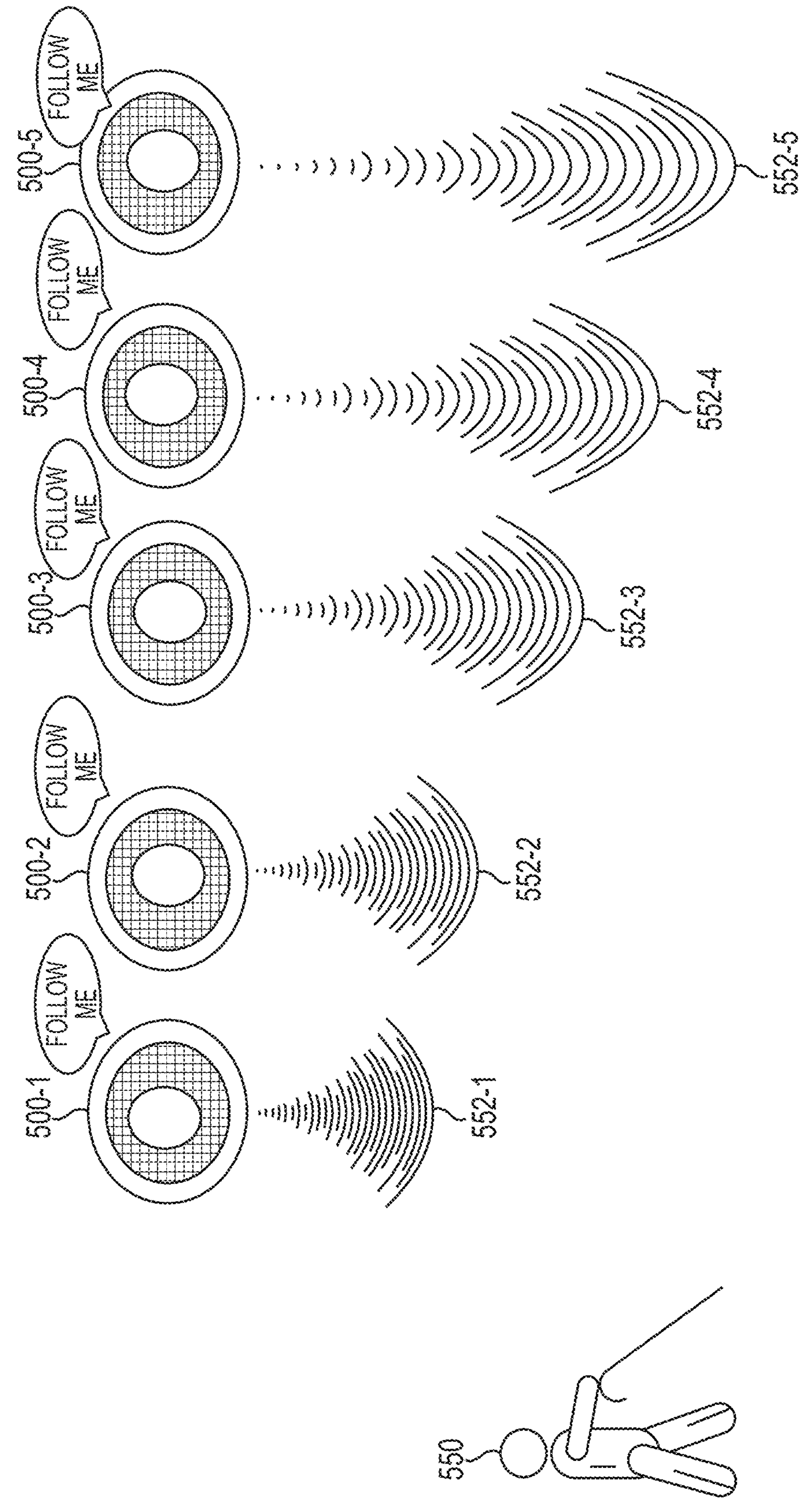
FIG. 5 is an illustration of broadcasting an audio message from each of a number of event notification devices in accordance with an embodiment of the present disclosure.

FIG. 5 is an illustration of broadcasting an audio message from each of a number of event notification devices 500-1, 500-2, 500-3, 500-4, . . . , 500-5 in accordance with an embodiment of the present disclosure. Each of the number of event notification devices 500-1, 500-2, 500-3, 500-4, . . . , 500-5 can correspond to event notification device 100 described in connection with FIG. 1 and/or the number of event notification devices 400 described in connection with FIG. 4.

Event notification device 500-1 can receive a BLE signal from a computing device of a user 550. A command to broadcast an audio message 552-1, 552-2, 552-3, 552-4, . . . , 552-5 indicating a direction of evacuation can be received by each of the number of event notification devices 500-1, 500-2, 500-3, 500-4, . . . , 500-5 after event notification device 500-1 transmits a notification of the BLE signal to a fire control panel, for example.

Each of the number of event notification devices 500-1, 500-2, 500-3, 500-4, . . . , 500-5 can broadcast the audio message 552-1, 552-2, 552-3, 552-4, . . . , 552-5 indicating the direction of evacuation responsive to receiving the command. The audio message 552-1, 552-2, 552-3, 552-4, . . . , 552-5 can include an audio command and/or a sound in a particular pitch. As illustrated in FIG. 5, the audio command can be "follow me", for example.

The command and/or sound can be broadcast by each of the event notification devices 500-1, 500-2, 500-3, 500-4, . . . , 500-5 at different times. The order can be based on distance from the user 550. For example, event notification device 500-1 that is on the evacuation route and first detected the BLE signal can broadcast the command and/or sound first followed by the next event notification device 500-2 along the evacuation route, then event notification device 500-3, event notification device 500-4, and event notification device 500-5. In some examples, a tone (e.g., a hazard warning) can be broadcast prior to broadcasting the audio message 552-1, 552-2, 552-3, 552-4, . . . , 552-5 indicating the direction of evacuation.

Figure 6:
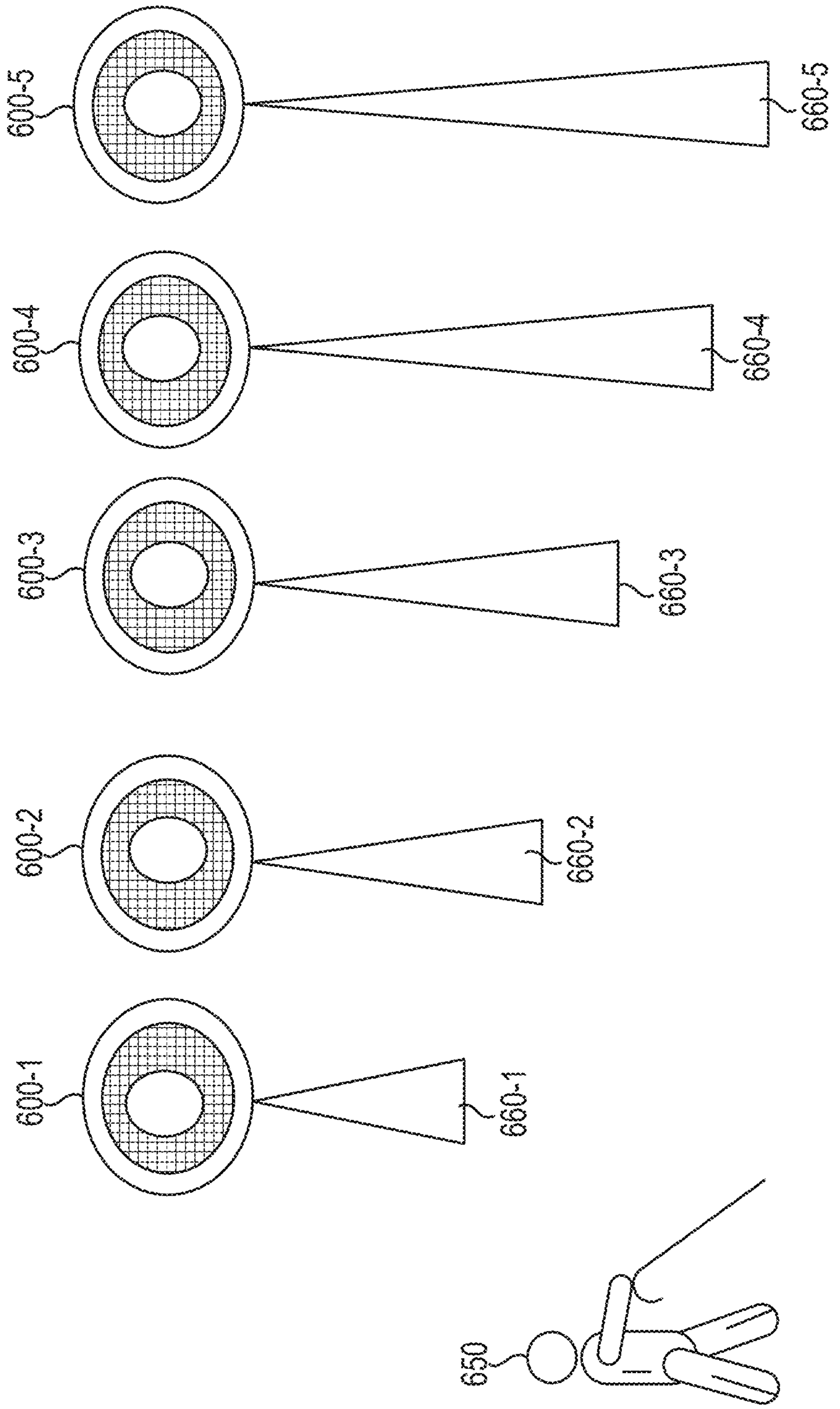
FIG. 6 is an illustration of emitting a light from each of a number of event notification devices in accordance with an embodiment of the present disclosure.

FIG. 6 is an illustration of emitting a light from each of a number of event notification devices 600-1, 600-2, 600-3, 600-4, . . . , 600-5 in accordance with an embodiment of the present disclosure. Each of the number of event notification devices 600-1, 600-2, 600-3, 600-4, . . . , 600-5 can correspond to event notification device 100 described in connection with FIG. 1 and/or the number of event notification devices 400 described in connection with FIG. 4.

Event notification device 600-1 can receive a BLE signal from a computing device of a user 650. A command to emit light 660-1, 660-2, 660-3, 660-4, . . . , 660-5 indicating a direction of evacuation can be received by each of the number of event notification devices 600-1, 600-2, 600-3, 600-4, . . . , 600-5 after event notification device 600-1 transmits a notification of the BLE signal to a fire control panel, for example.

The number of event notification devices 600-1, 600-2, 600-3, 600-4, . . . , 600-5 emit lights 660-1, 660-2, 660-3, 660-4, . . . , 660-5 indicating the direction of evacuation responsive to receiving the command. In some examples, the number of event notification devices 600-1, 600-2, 600-3, 600-4, . . . , 600-5 can strobe the lights 660-1, 660-2, 660-3, 660-4, . . . , 660-5 to indicate the direction of evacuation.

Each of the number of lights 660-1, 660-2, 660-3, 660-4, . . . , 660-5 can be emitted at different times. The order can be based on distance from the user 650. For example, the event notification device 600-1 that is on the evacuation route and first detected the BLE signal can emit light 660-1 first followed by the next event notification device 600-2 along the evacuation route, then event notification device 600-3, event notification device 600-4, and event notification device 600-5. In some examples, a tone can be broadcast prior to emitting the lights 660-1, 660-2, 660-3, 660-4, . . . , 660-5 indicating the direction of evacuation.

Figure 7A:
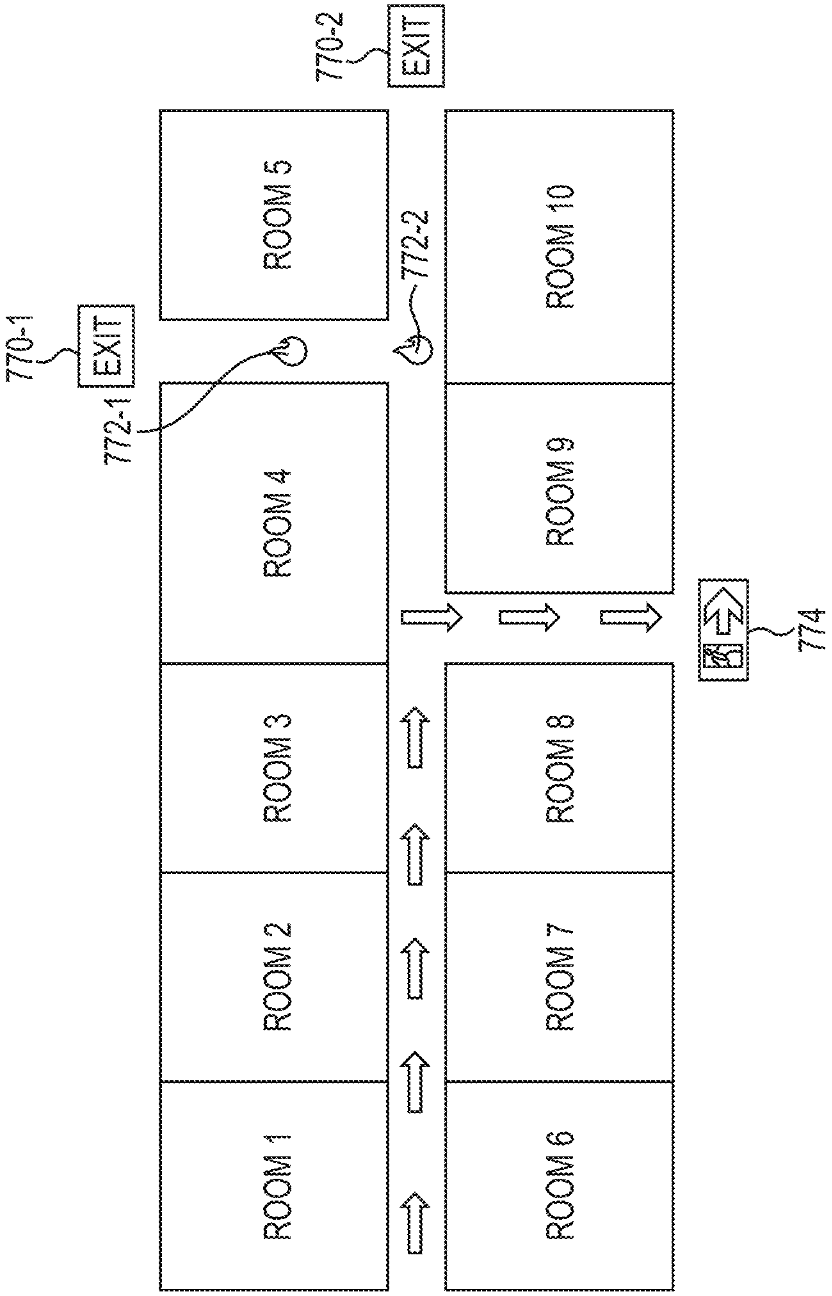
FIG. 7A is an illustration of an evacuation route in accordance with an embodiment of the present disclosure.

FIGS. 7A-7D are illustrations of an evacuation route 774 in accordance with an embodiment of the present disclosure. As illustrated in FIG. 7A, the evacuation route 774 can avoid directing users towards exits 770-1, 770-2 that are blocked by fire 772-1, 772-2.

Figure 7B:
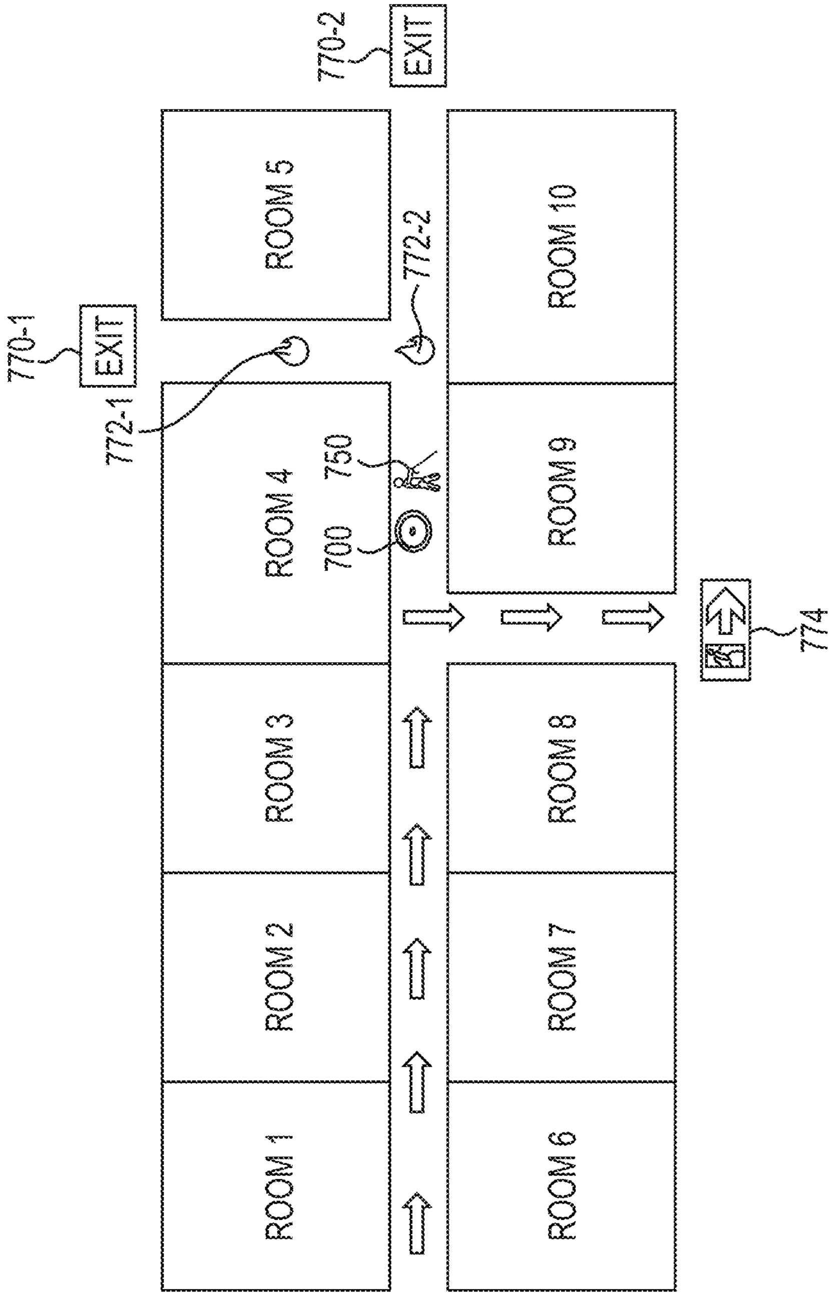
FIG. 7B is an illustration of an evacuation route in accordance with an embodiment of the present disclosure.

An event notification device 700, which can correspond to event notification device 100, 400, 500, and 600 described in connection with FIGS. 1, 4, 5, and 6, respectively. In some examples, the event notification device 700 can receive a BLE signal from a computing device of user 750, as illustrated in FIG. 7B. The event notification device 700 can broadcast an audio message or emit a light to indicate a direction of evacuation to the user 750 away from exits 770-1, 770-2, which are blocked by fire 772-1, 772-2.

Figure 7C:
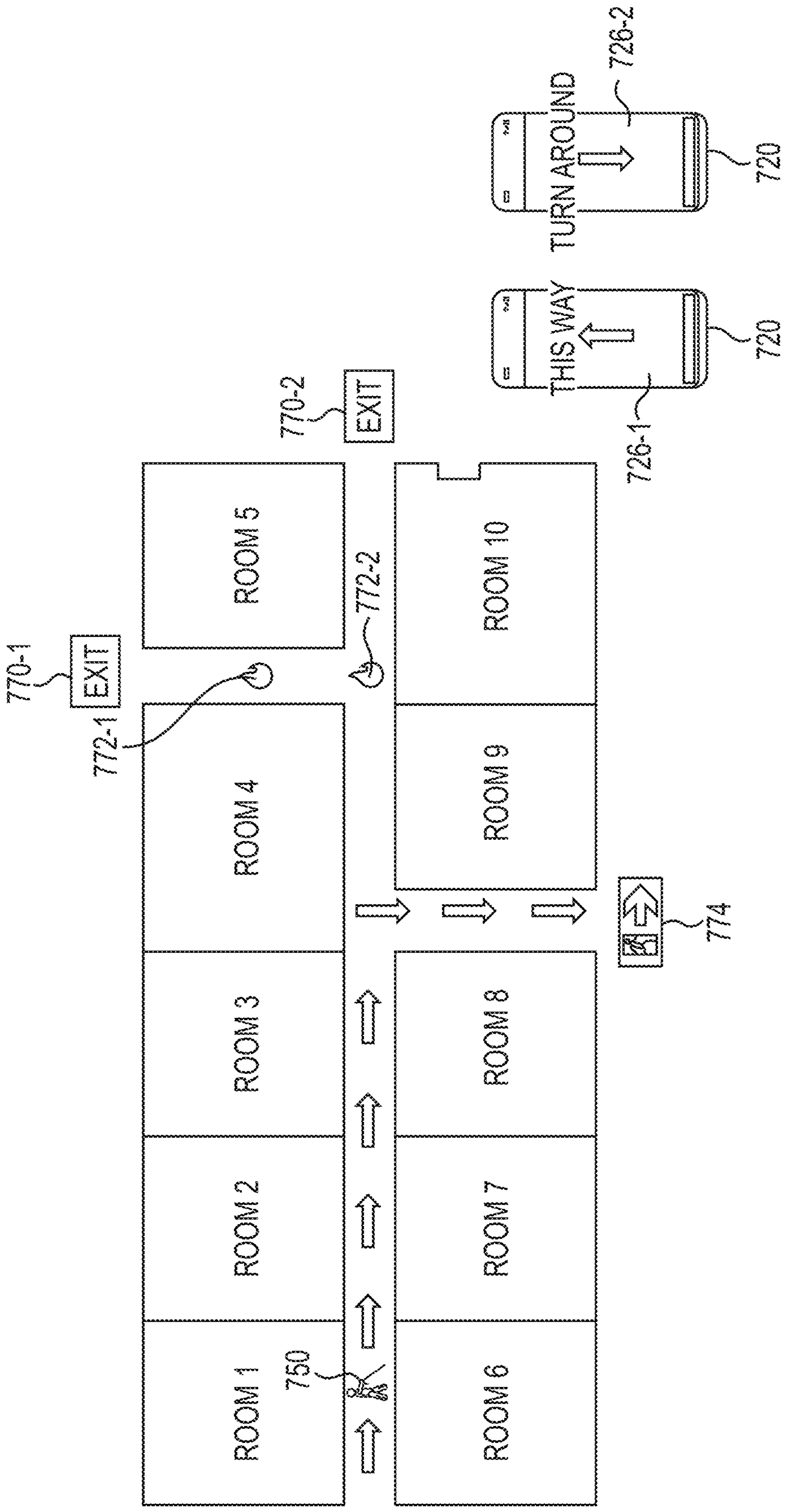
FIG. 7C is an illustration of an evacuation route in accordance with an embodiment of the present disclosure.

As illustrated in FIG. 7C, a computing device 720, which can correspond to computing device 220 described in connection with FIG. 2 and/or computing device 420 described in connection with FIG. 4, can indicate a direction of evacuation to the user 750 via user interface 726-1, 726-2. The user interface 726-1, 726-2 can display an arrow pointing in the direction of evacuation for the user 750 to follow for example.

Figure 7D:
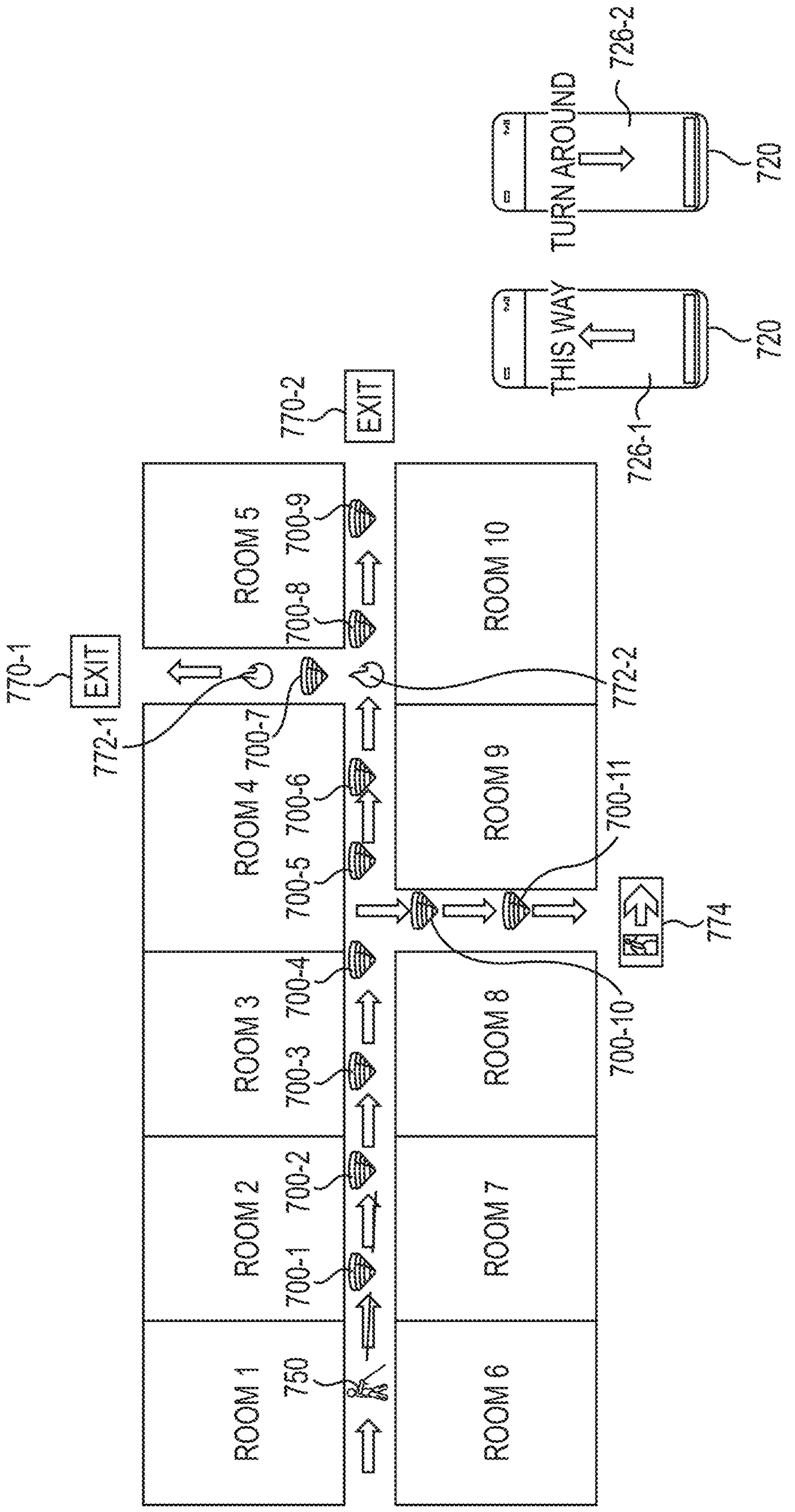
FIG. 7D is an illustration of an evacuation route in accordance with an embodiment of the present disclosure.

A number of event notification devices 700-1, 700-2, 700-3, 700-4, 700-5, 700-6, 700-7, 700-8, 700-9, 700-10, . . . , 700-11 can be located throughout a facility, as illustrated in FIG. 7D. The number of event notification devices 700-1, 700-2, 700-3, 700-4, 700-5, 700-6, 700-7, 700-8, 700-9, 700-10, . . . , 700-11 can be used to locate and report fires 772-1, 772-2. Event notification device 700-1 can receive a BLE signal from the computing device 726 of user 750. The event notification devices 700-1, 700-2, 700-3, 700-4, 700-10, and 700-11 can broadcast an audio message or emit light to indicate a direction of evacuation to the user 750 away from exits 770-1, 770-2, which are blocked by fire 772-1, 772-2. The computing device 720 of the user 750 can also indicate a direction of evacuation to the user 750 via user interface 726-1, 726-2.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An event notification system, comprising:
a first event notification device of a number of event notification devices, comprising:
a first speaker; and
a first controller configured to:
receive a first command to broadcast an audio message indicating a direction of evacuation in response to the first event notification device being the first event notification device along an evacuation route; and
broadcast the audio message sequenced with the number of event notification devices along the evacuation route in order based on distance from a user to indicate the direction of evacuation via the first speaker in response to receiving the first command; and
the number of event notification devices, each comprising:
a speaker; and
a controller configured to:
receive a second command to broadcast the audio message indicating the direction of evacuation; and
broadcast the audio message sequenced with the number of event notification devices along the evacuation route in the order to indicate the direction of evacuation via the speaker in response to receiving the second command after the first speaker broadcasts the audio message.

2. The system of claim 1, wherein the first controller is configured to repeat the broadcast after a last event notification device of the number of event notification devices along the evacuation route has broadcast the audio message.

3. The system of claim 1, wherein the first controller is configured to broadcast a tone sequenced with the number of event notification devices to indicate the direction of evacuation prior to broadcasting the audio message.

4. The system of claim 3, wherein the tone is a directional sound source comprising frequencies localized by a human ear.

5. The system of claim 1, wherein the audio message comprises instructions to follow this route.

6. The system of claim 1, wherein the audio message includes an audio command.

7. The system of claim 1, wherein the audio message is within one or more frequency bands.

8. An event notification system, comprising:
a first event notification device of a number of event notification devices, comprising:
a first visual alarm device; and
a first controller configured to:
receive a first command to emit a first light indicating a direction of evacuation in response to the first event notification device being the first event notification device along an evacuation route; and
emit the first light sequenced with the number of event notification devices along the evacuation route in order based on distance from a user to indicate the direction of evacuation via the first visual alarm device in response to receiving the first command; and
a second event notification device of the number of event notification devices, comprising:
a second visual alarm device; and
a second controller configured to:
receive a second command to emit a second light indicating the direction of evacuation in response to the second event notification device being the second event notification device along the evacuation route; and
emit the second light sequenced with the number of event notification devices along the evacuation route in the order to indicate the direction of evacuation via the second visual alarm device in response to receiving the second command after the first visual alarm device emits the first light.

9. The system of claim 8, wherein the first controller is configured to repeat the emission of the first light after a last event notification device along the evacuation route has emitted a last light.

10. The system of claim 8, wherein the evacuation route leads to at least one of: an exit, away from danger, or a less populated area.

11. The system of claim 10, wherein the second event notification device is closer to the exit than the first event notification device.

12. An event notification system, comprising:
an event notification device of a number of event notification devices, comprising:
a speaker;
a visual alarm device; and
a controller configured to:
broadcast a tone sequenced with the number of event notification devices along an evacuation route in order based on distance from a user to indicate a direction of evacuation via the speaker;
trigger the visual alarm device sequenced with the number of event notification devices along the evacuation route in the order to indicate the direction of evacuation via the visual alarm device in response to broadcasting the tone; and
broadcast an audio message sequenced with the number of event notification devices along the evacuation route in the order to indicate the direction of evacuation via the speaker in response to triggering the visual alarm device.

13. The system of claim 12, wherein the system is a two-wire addressable fire system.

14. The system of claim 12, further comprising a fire control panel comprising a fire control panel controller.

15. The system of claim 14, wherein the fire control panel controller is configured to transmit a command to the event notification device.

16. The system of claim 14, wherein the fire control panel controller is configured to identify the number of event notification devices along the evacuation route.

17. The system of claim 16, wherein the fire control panel controller is configured to sequence the number of event notification devices along the evacuation route in order of the direction of evacuation.

18. The system of claim 17, wherein the fire control panel controller is configured to transmit a command to each of the number of event notification devices along the evacuation route in the sequence.

19. The system of claim 18, wherein the fire control panel controller is configured to transmit a command to the event notification device first in response to the event notification device being the first event notification device along the evacuation route.

20. The system of claim 18, wherein the fire control panel controller is configured to transmit a command to the event notification device last in response to the event notification device being the last event notification device along the evacuation route.

* * * * *